(12) United States Patent
Luo et al.

(10) Patent No.: US 7,430,231 B2
(45) Date of Patent: Sep. 30, 2008

(54) VERTICAL CAVITY SURFACE EMITTING LASER (VCSEL) ARRAYS PUMPED SOLID-STATE LASERS

(76) Inventors: Ningyi Luo, 201 Helado Rd., Fremont, CA (US) 94539; Sheng-Bai Zhu, 43296 Cedarwood Dr., Fremont, CA (US) 94538

( * ) Notice: Subject to any disclaimer, the term of this patent is extended or adjusted under 35 U.S.C. 154(b) by 7 days.

(21) Appl. No.: 11/414,492

(22) Filed: Apr. 28, 2006

(65) Prior Publication Data

US 2006/0245460 A1  Nov. 2, 2006

Related U.S. Application Data

(60) Provisional application No. 60/676,619, filed on Apr. 29, 2005.

(51) Int. Cl.
*H01S 3/091* (2006.01)
(52) U.S. Cl. .................. 372/75; 372/70; 372/41; 372/10; 372/21; 372/22
(58) Field of Classification Search ............ 372/41, 372/70, 75, 10, 21, 22, 29.01
See application file for complete search history.

(56) References Cited

U.S. PATENT DOCUMENTS

| | | | |
|---|---|---|---|
| 4,858,242 A | 8/1989 | Kuper et al. | |
| 4,910,746 A | 3/1990 | Nicholson | |
| 5,052,010 A | 9/1991 | Blumentritt et al. | |
| 5,307,365 A | 4/1994 | Stappaerts et al. | |
| 5,553,092 A | 9/1996 | Bruce et al. | |
| 5,705,018 A * | 1/1998 | Hartley | 156/345.1 |
| 5,754,578 A | 5/1998 | Jayaraman | |
| 5,796,766 A * | 8/1998 | Hargis et al. | 372/36 |
| 5,867,518 A | 2/1999 | Filgas | |
| 5,978,407 A * | 11/1999 | Chang et al. | 372/72 |
| 5,982,802 A | 11/1999 | Thony et al. | |
| 6,009,110 A * | 12/1999 | Wiechmann et al. | 372/10 |
| 6,704,341 B1 | 3/2004 | Chang | |
| 6,829,286 B1 * | 12/2004 | Guilfoyle et al. | 372/108 |
| 6,873,639 B2 | 3/2005 | Zhang | |
| 6,888,871 B1 | 5/2005 | Zhang et al. | |
| 2001/0001004 A1 | 5/2001 | Lubrano | |
| 2005/0025211 A1 * | 2/2005 | Zhang et al. | 372/101 |
| 2005/0201442 A1 | 9/2005 | Luo et al. | |

* cited by examiner

*Primary Examiner*—Minsun Harvey
*Assistant Examiner*—Kinam Park

(57) ABSTRACT

Solid-state lasers pumped by incoherent or partially coherent, monochromatic light sources such as high power VCSEL arrays. Efficient and uniform injection of pumping energy into gain medium is achieved through spectral match of the pump source with the gain medium absorption and multi-bounce reflections of unabsorbed pump light in a diffusing pump chamber. One preferred embodiment of the diffusing pump chamber is a hollow cylinder coaxially surrounding the gain medium. One or more transparent windows, slit-shaped or otherwise, for transmission of pump light are evenly distributed around the perimeter of the chamber and are parallel to the axis. Another preferred embodiment of the diffusing pump chamber is a highly reflecting compound parabolic concentrator. A 2-D VCSEL array is employed as the pump source and the gain medium is located at the focusing point of the chamber. This invention demonstrates solid-state lasers that are compact, robust, low-cost, and able to produce high power output in CW or pulse modes for practical applications. An important application of the present invention is high-power solid-state lasers featuring wavelength conversion such as optical parametric oscillation and second-harmonic generation. Another important application of the present invention is injection seeding, especially for pulse mode with high repetition rates.

5 Claims, 12 Drawing Sheets

VERTICAL CAVITY SURFACE EMITTING LASER (VCSEL) ARRAYS PUMPED SOLID-STATE LASERS

CROSS REFERENCE TO RELATED APPLICATION

This application claims the benefit of U.S. Provisional Application No. 60/676,619, filed Apr. 29, 2005, which is hereby incorporated by reference in its entirety.

FIELD OF THE INVENTION

This invention relates generally to the field of solid-state lasers, and more particularly, it relates to solid-state lasers pumped by incoherent or partially coherent, monochromatic light sources such as vertical cavity surface emitting laser (VCSEL) array or arrays.

BACKGROUND OF THE INVENTION

Solid-state lasers have found applications in all areas where high peak power or high continuous power are required. Examples include material processing (cutting, drilling, welding, marking, heat treating, etc), semiconductor fabrication (wafer cutting, IC trimming), graphic arts (printing, copying), test equipment (confocal microscope), biotechnology instrumentations (proteomics, DNA sequencing, tomography, flow cytometry), medical applications (diagnosis, therapy, micro-surgery), military applications (range finding, target designation), entertainment (laser TV, DVD), and scientific research, to mention a few.

Unlike semiconductor or diode lasers, which are almost always pumped electrically, solid-state lasers based on active ions doped in crystals or glasses are optically pumped. One of the key components of a solid-state laser therefore is an efficient and low-cost light source to provide the optical pumping.

Such optical pumping of solid-state lasers requires the efficient conversion of electrical energy into optical radiation, and an efficient coupling between the generated high-radiation fluxes and the solid-state laser active (gain) medium. Efficient coupling requires a close match between the output spectrum of the pumping source and the characteristic absorption bands of the particular gain medium employed. To maximize the laser output and minimize thermal effects, precise spatial overlap and uniform absorption of pumped photons over the laser mode volume is important.

Flash lamps, arc lamps, laser diodes, and some nonelectric light sources have been employed to pump solid-state lasers over the past years. All of these pumping sources have serious limitations and drawbacks, however.

Historically, flash lamps have been widely utilized for pumping solid-state lasers partly because of their high conversion efficiency. However, due to their non-monochromatic output, the coupling efficiency is generally low. Increasing the flash-lamp's filling pressure could improve the conversion efficiency, however, this would require higher trigger voltage and the simmer current would be more difficult to establish and maintain. The flash-lamp's low coupling efficiency causes a large amount of heat to be generated during the pumping, which limits repetition rates of solid-state lasers pumped by flash lamps. Additionally, the excessive heating leads to undesirable thermal effects such as thermal birefringence, thermal lensing, and even thermal damage. Finally, flash lamps typically exhibit short operating lifetimes, causing frequent replacement necessary.

In sharp contrast to flash lamps, semiconductor diode lasers produce characteristically narrow emissions, which may be advantageously matched to the absorption peak of a laser active medium, resulting in a high coupling efficiency. Unfortunately however, semiconductor lasers are effectively low-peak-power devices and as such, are not best applicable to high-peak-power pulsed mode operations and can be easily damaged by electrostatic discharge or current spikes. In addition, diode laser pumping often does not operate over desirable temperature ranges unless inefficient and oftentimes cumbersome temperature control is used. Moreover, diode lasers have a relatively short lifetime of only 5,000 to 10,000 hours and their cost is high.

Side-pumped lasers typically use cylindrical rods and thus do not exhibit efficient mode-pump overlap, which is particularly problematic for high power scaling. In addition, low dopant percentage has to be used to avoid absorption of pumping energy concentrated near the surface of the laser medium, which may lead to poor overlap between the laser mode and the pumped volume, as well as degradation of the quality of the laser beam due to hot spots inside the gain medium.

Still other attempts were made to pump solid-state lasers with other semiconductor devices, in particular, incoherent monochromatic light sources such as the high-intensity Amplified Spontaneous Emissions (ASE) from rare-earth-doped fluoride, telluride and silica fibers, ASE from superluminescent diodes, spontaneous emission from Light Emitting Diodes (LEDs), and incoherent or partially coherent emission from Vertical Cavity Surface Emitting Laser (VCSEL) arrays. Among them, LEDs and VCSELs are of particular interest, because their spectral bandwidths may suitably match the absorption spectrum of the lasing medium. In addition, high power LEDs and VCSELs offer some particularly important wavelength ranges, where conventional high power edge emitting laser diodes are unavailable.

VCSEL is a semiconductor device that emits light normal to the device plane with a symmetric beam profile. It has high slope efficiency, is relatively inexpensive and easy to produce. By arranging plurality of VCSEL devices into an array, it is possible to generate high optical power density. In order to serve as a pumping source, the VCSEL array must have a sufficiently large surface area. Three properties, namely, effective heat dissipation, efficient utilization of VCSEL output beam, and uniform injection of the pump energy into gain medium, are thus required.

Heat dissipation may be improved by including a heat sink attached to the device side. In order to decrease the divergence of the VCSEL output beams, beam focusing/collimating elements such as external and discrete lens systems or integrated microlenses may be utilized. For example, in U.S. Pat. No. 6,888,871 and U.S. Patent Application Publication No. 2005/0025211, Zhang et al. have invented a VCSEL device integrated with microlens or microlens arrays and attached with a heat sink. The device emits high-power laser beam with a shape matching the core of fiber optic cables and can be used for pumping fiber lasers such as Er:Yb-doped glass laser.

An innovative solid-state laser device pumped by incoherent or partially coherent monochromatic light sources such as LED and VCSEL arrays has been disclosed by Luo, Zhu, Lu and Zhou in U.S. Patent Application No. 2005/0201442. With this invention, the pump light is efficiently and uniformly coupled into a laser gain medium through a diffusing pump chamber. Compared with LED arrays, VCSEL arrays may have higher optical power and emit light of less divergence. This poses a need for inventing different structures to optimize the coupling efficiency.

SUMMARY OF THE INVENTION

Accordingly, we have invented a solid-state laser that is pumped by VCSEL arrays. Our invention provides for efficient coupling and absorption of the partially coherent monochromatic pump light, resulting in a compact, robust, and relatively low-cost laser that may efficiently operate over wide temperature and performance ranges while consuming relatively low energy.

Viewed from a first aspect and according to our invention, pump light emanating from a partially coherent monochromatic light source such as a VCSEL array is coupled into a laser gain medium through the use of a diffusing pump chamber. Our inventive diffusing pump chamber provides for multi-bounce reflections of unabsorbed pump light, resulting in uniform distribution of gain medium excitation. One preferred embodiment of our inventive diffusing pump chamber is a hollow cylinder coaxially surrounding the gain medium. There are one or more windows for transmission of the pump light. One or more VCSEL arrays are disposed outside the diffusing pump chamber with even separation along the perimeter. Another preferred embodiment of our inventive diffusing pump chamber is a highly reflecting Compound Parabolic Concentrator (CPC). A 2-D VCSEL array is employed as the pump source and the gain medium is located at the focusing point of the diffusing pump chamber. Our inventive structure provides a convenient mechanical mounting for the pump source and associated driver electronics. Still further, our inventive structure provides for the efficient dissipation of heat, resulting in a laser capable of sustained, high-power, continuous (CW) or pulsed output—including those with extremely high repetition rates.

Viewed from a second aspect, our inventive teachings result in solid-state lasers exhibiting three basic characteristics, namely, 1) the efficient delivery of pump energy into a lasing media; 2) the efficient transfer of excited energy into stimulated emission with minimum loss from spontaneous emission or non-radiative quenching—a characteristic particularly important for laser materials having short upper state lifetimes; and 3) the novel integration of technologies such as high efficiency and high power VCSEL arrays and solid-state laser materials in conjunction with the uniform absorption of pumping energies. The resulting inventive structures are highly flexible, and therefore applicable to a large group of lasing media, operating in different modes that may be applied to a plethora of laser systems at wavelengths that have important applications not available to direct pumping technologies.

Viewed from a third aspect, our inventive teachings may be incorporated with other technologies such as wavelength conversion and/or Q-switch for various applications. According to our invention, a nonlinear optical crystal may be introduced in the laser path for intracavity Optical Parametric Oscillation (OPO) or Second-Harmonic Generation (SHG). Moreover, a birefringent crystal may be sandwiched in between the gain medium and the nonlinear optical crystal for polarization/wavelength selection and/or elimination of possible interference between the signal and the idler in a singly resonant OPO. These crystals are optically bounded to form a monolithic or hybrid structure. High power laser output at a desired wavelength is achievable through continuously pumped, repetitively Q-switched operation.

BRIEF DESCRIPTION OF THE DRAWINGS

Further objects of the invention will be more clearly understood when the following description is read in conjunction with the accompanying drawings in which.

DETAILED DESCRIPTION

Figure 1A:
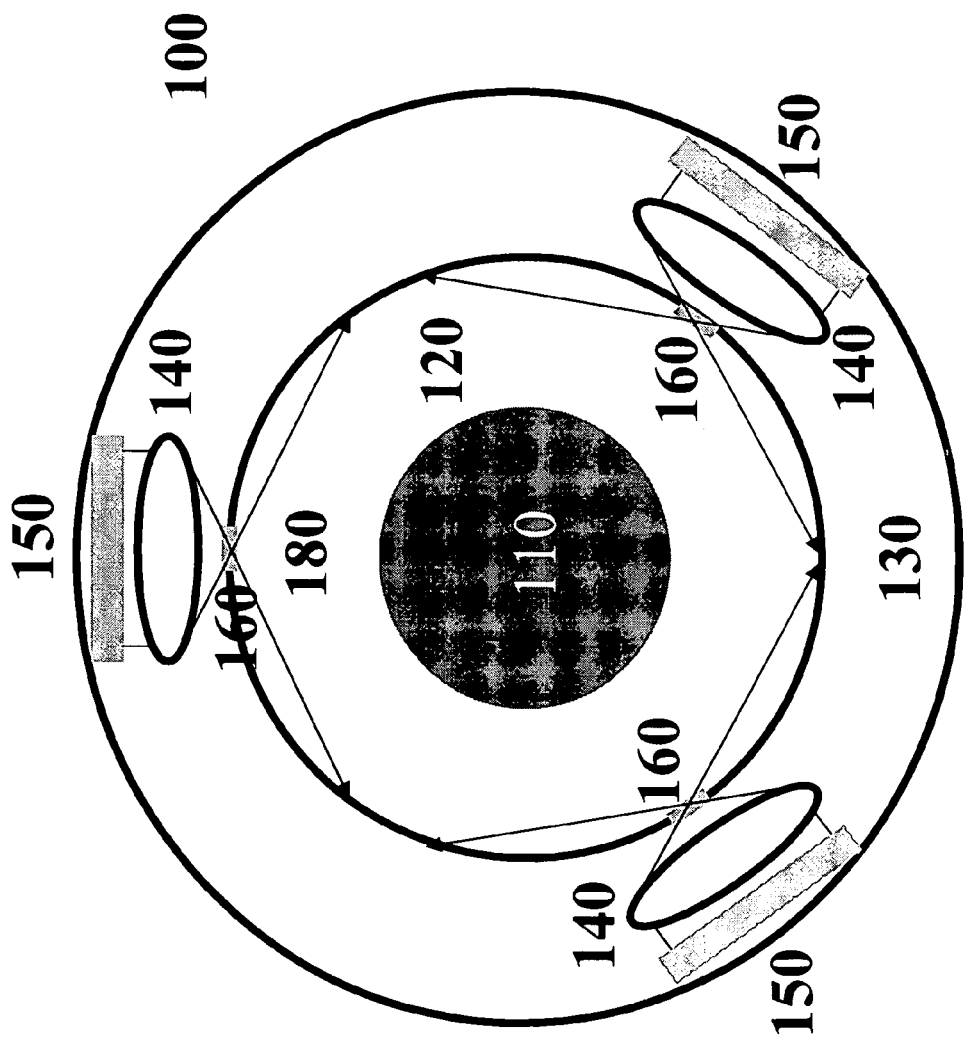
FIG. 1A shows a schematic, cross-sectional view of the VCSEL pumping section in a solid-state laser according to the present invention.

Referring now to drawings and in particular to FIG. 1A, there is shown in schematic form a cross-sectional view of the VCSEL pumping section of a solid-state laser 100 constructed according to our invention. In particular, a laser gain medium 110 is shown at the center or core of the inventive laser structure. The laser gain medium 110 is situated within a diffusing pump chamber 120 and axial aligned therein. One or more transparent slits are evenly distributed around the perimeter of the diffusing pump chamber longitudinally along the axis to form transmitting windows 160. Surrounding the diffusing pump chamber 120 are VCSEL arrays 150 served as the pump source and beam focusing elements 140 for directing the pump light 180 into the diffusing pump chamber 120 through the transmitting windows 160. According to our inventive teachings, the beam focusing elements 140 can be discrete lenses or integrated microlenses for focusing the pump light at the surface of transmitting windows 160. The entire assembly is further positioned within a housing 130, which is also served as a heat sink for effectively dissipating the heat generated from the VCSEL arrays 150.

The outermost housing 130 is preferably a metal shell or other material that provides suitable physical protection of the laser system and heat dissipation characteristics. Accordingly, heat-conductive plastics or ceramics are suitable materials for incorporation into our inventive laser.

Preferably, the inner surface of the diffusing pump chamber 120 is coated with highly diffusive reflecting materials such as Spectralon, BeO, MgO, $BaSO_4$, or ceramics for diffuse reflection. However, the transmitting windows 160 are anti-reflectively (AR) coated to minimize reflection loss at the pump wavelength. High power lasers may use circulating water or other index-match coolants to remove excessive heat. Alternatively, the space between the laser gain medium and the inner surface of the diffusing pump chamber may be filled with transparent solid-state materials with high thermal conductivity for heat dissipation. Still alternatively, the solid-state filler may contain micro-channels for enhancing heat dissipation. In these cases, the diffusing pump chamber 120 may be a tube of glass or other transparent materials and HR coated on the outer surface. It should be mentioned that the transmitting windows 160 are not limited to slot shape. It may be any other shapes with various surface-finishing for any desired applications. In an alternative embodiment, the transmitting windows 160 may be lenses or other beam shaping elements for effective delivery of pump light and/or enhancing the uniformity.

Shown in FIG. 1A are three VCSEL arrays 150 that are evenly mounted on the housing 130. Each individual VCSEL array includes a number of individual VCSEL devices (not specifically shown). Each individual VCSEL device emits its respective pump light that illuminates and activates the laser gain medium 110. Advantageously, the specific number of the VCSEL devices in each array and their particular operational and emission characteristics may be selected to enhance or otherwise optimize the performance of the laser. In particular, it is important to match the output emission spectrum of the VCSEL arrays 150 with the absorption spectrum of the gain medium 110. Of course, and as will be readily understood, the total pumping energy generated by the VCSEL arrays 150 must be sufficient to induce lasing operation while not being too high to avoid efficiency reduction and, probably, thermal damage.

It should be noted and understood at this point that our invention is not limited to the three arrays as is shown. Fewer or more may be used, depending upon their characteristics and the characteristics of the laser gain medium 110 employed. A preferred embodiment, however, will likely have an odd number of VCSEL arrays.

When energized, the VCSEL arrays 150 emit light at a wavelength characteristic of the particular VCSEL. Preferably with negligible loss, the light emitted from the VCSEL arrays 150 and focused by the beam focusing elements 140 passes through respective transmitting windows 160, and enters into the diffusing pump chamber 120. While much of the light 180 does strike the laser gain medium 110, that portion of the light which does not, or which passes through the gain medium 110, will eventually strike the highly reflective (HR) inner surface of the diffusing pump chamber 120 where it will be reflected back towards the laser gain medium 110. This process may be repeated a number of times, thereby enhancing the efficiency of the inventive structure while promoting a uniform gain distribution within the gain medium.

To further enhance the pump uniformity, the outer surface of the laser gain medium 110 may be ground to give a surface roughness of 20 to 100 micro inches RMS.

Advantageously, and as can be readily appreciated by those skilled in the art, our inventive teachings are applicable to a variety of laser gain media including Er:YAG, Tm:YAG, Yb:YAG, Ho:YAG, Ho:YLF, Er:YLF, Er:YALO$_3$, Er:Cr:YSGG, Er:Yb:glass, Nd:YLF, Nd:YAG, Nd:KGW, Nd:YVO$_4$, Nd:GdVO$_4$, Cr:Nd:GSGG, Cr:Mg$_2$SiO$_4$ and Co:MgF$_2$, to mention a few. In addition, active ion doping levels may vary vastly to meet desired operating conditions and/or to desirably modify the mode-pump overlap. The laser gain medium 110 may be a rod or of other shapes. Depending on the required laser output, the precise length of the laser gain medium may vary considerably as well. In fact, the selection of VCSEL array output, laser gain medium, configuration, and operation mode, is a matter of design choice and highly flexible with our inventive teachings.

With this structural discussion in place, we may now better understand the operational aspects of our inventive laser structure. In particular, and with continued reference to FIG. 1A, one or more of the individual lasers contained in VCSEL arrays 150 are energized such that they emit one or more characteristic pump lights. It is important to note that the operation of the VCSEL devices may be continuous or selectively turned on or off such that they operate intermittently and thereby "pulse" the laser. In addition, where multiple arrays of VCSELs are disposed around the perimeter of a laser gain medium, such as in this FIG. 1A, individual arrays or VCSEL devices may be selectively operated—preferably under computer or other automatic control—to produce a desired output. Moreover, where the VCSEL arrays are disposed lengthwise along the laser gain medium 110, the VCSEL devices may be selectively operated along the length as well as the perimeter to realize any beneficial operational performance that may result from such operation.

Figure 1B:
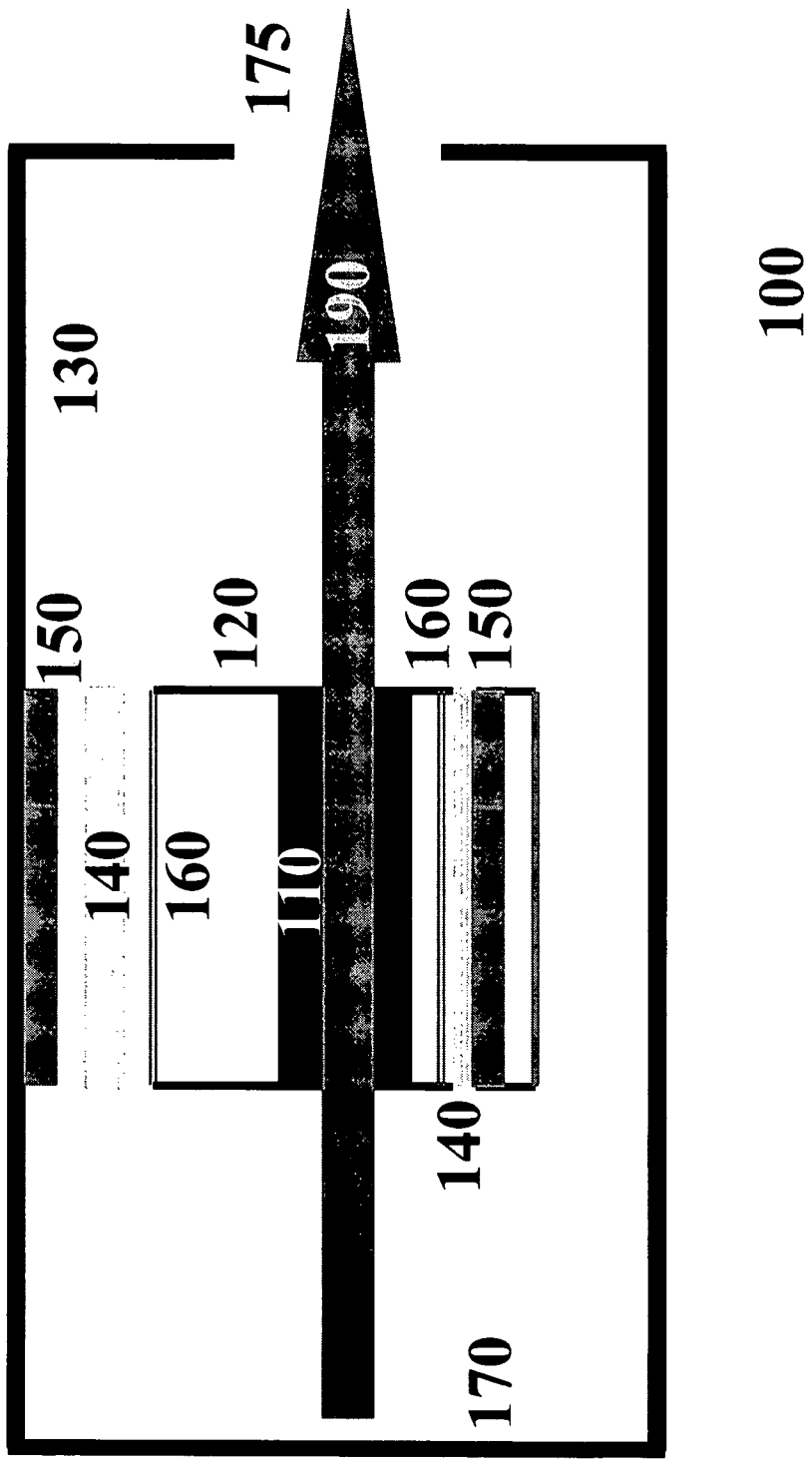
FIG. 1B shows a longitudinal sectional view of the inventive laser structure depicted in FIG. 1A.

A longitudinal sectional view of the solid-state laser system depicted in FIG. 1A is shown in FIG. 1B. A highly reflective mirror 170 and a partially transparent mirror 175 form a Fabry-Perot resonator chamber. In operation, the gain medium 110 is optically excited with the pump light emitted from the VCSEL arrays 150 and the population is inversed. With appropriate selection of VCSEL device characteristics and the surface area of the VCSEL arrays, the oscillation threshold condition can be met. The generated laser beam 190 is extracted through the output coupler 175.

Figure 2:
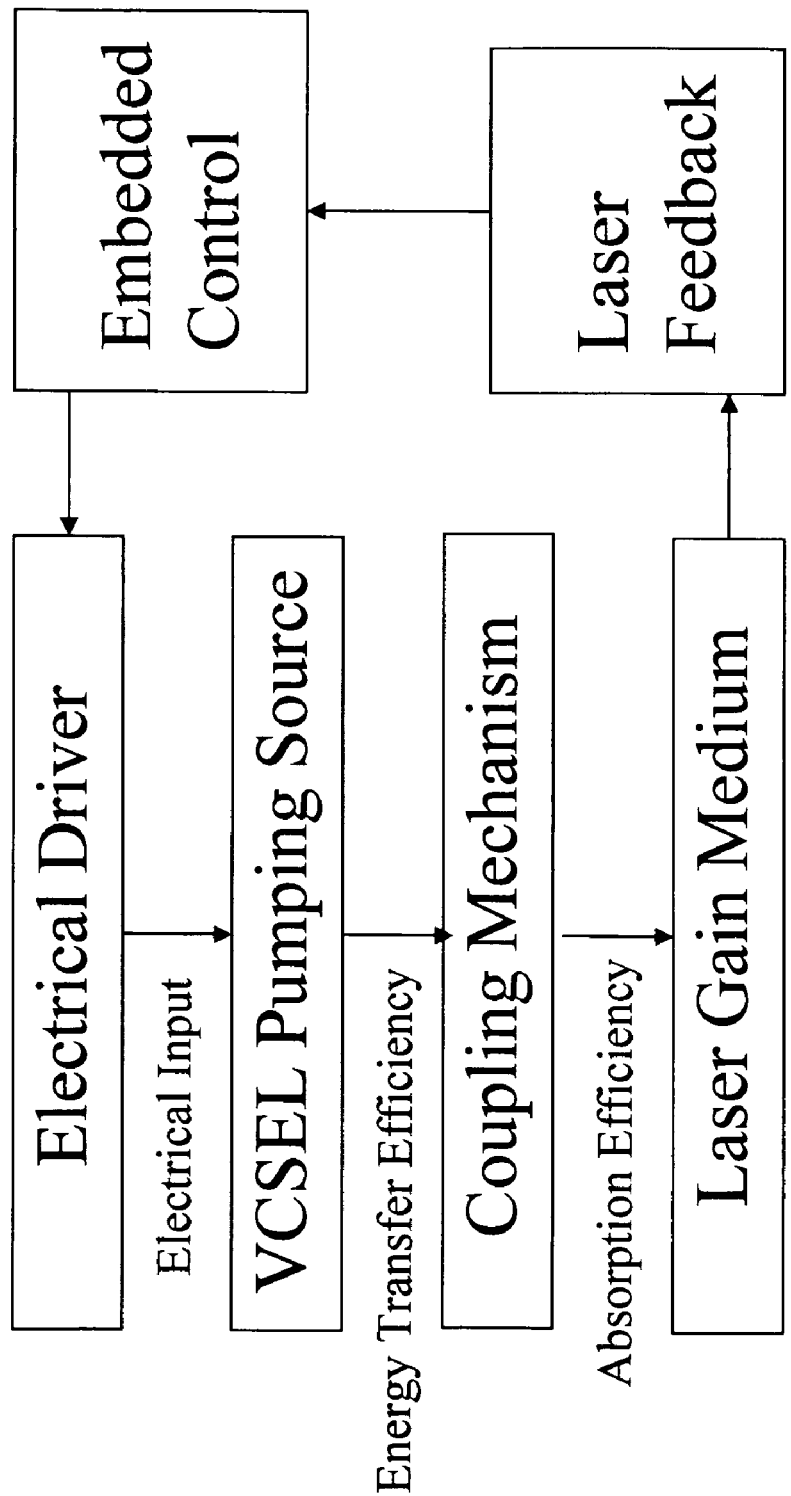
FIG. 2 is a functional block diagram of a solid-state laser according to the present invention.

FIG. 2 shows a functional block diagram of a solid-state laser according to the present invention. The VCSEL pump source, which is specifically labeled as 150 in FIGS. 1A and 1B, is energized by the electrical driver (not shown in FIGS. 1A and 1B). Part of the electrical energy is converted into partially coherent and monochromatic radiation, which is further delivered into the laser gain medium, labeled as 110 in FIGS. 1A and 1B, through the coupling mechanism. The driving energy is advantageously controlled through laser feedback. This operation may be made continuous, pulsed, or some desirable variation thereof. As can be readily appreciated by those skilled in the art, our inventive teachings, when combined with state-of-the-art computer controlled feedback, permits advantageously variable laser output, including pulsed output as well as sophisticated variable pulsed output, all under computer or other automatic control.

Figure 3:
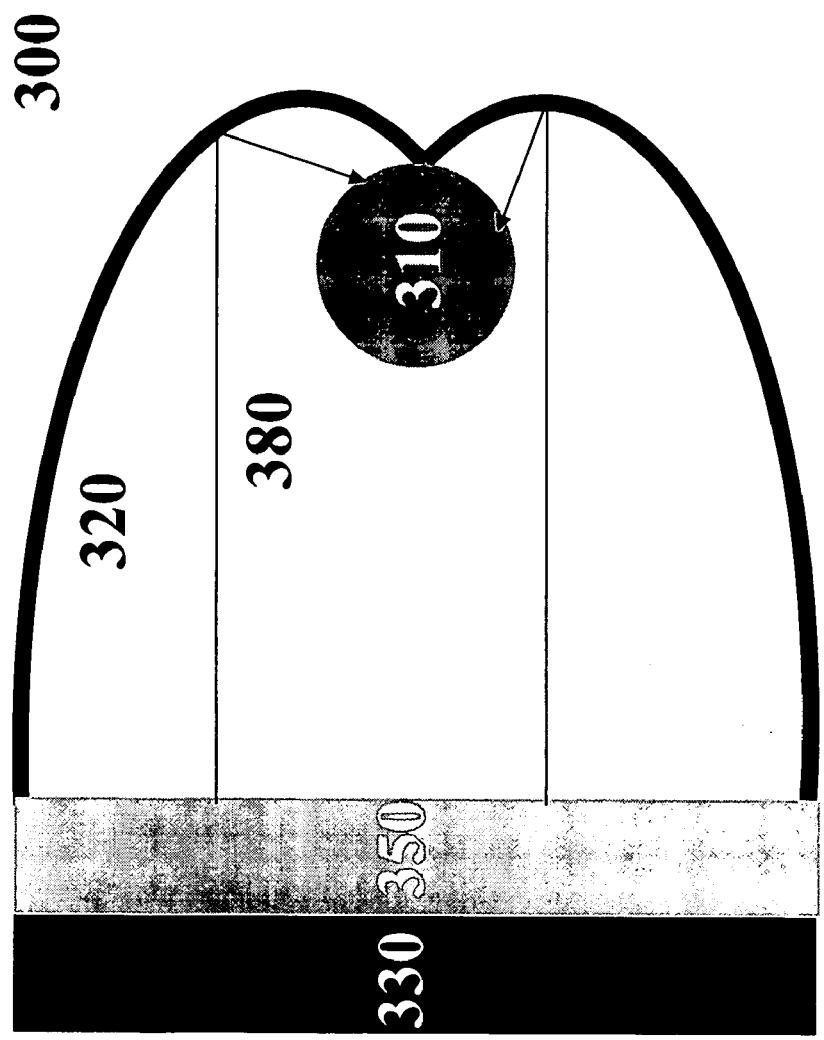
FIG. 3 shows a schematic, cross-sectional view of an alternative embodiment of the present invention.

Turning our attention now to FIG. 3, there is shown a schematic cross-sectional view of an alternative embodiment of a solid-state laser exhibiting our inventive concepts. In particular, laser assembly 300 includes a gain medium 310, a diffusing pump chamber 320, and a 2-D VCSEL array 350, which is attached to a heat sink 330.

Advantageously, the diffusing pump chamber 320 is a highly reflecting compound parabolic concentrator (CPC) with two overlapped parabolic portions. Preferably, the CPC surface is constructed by metal or Pyrex glass coated with highly reflecting metal film or dielectric HR thin film or highly diffuse reflecting materials such as Spectralon, BeO, MgO, or BaSO$_4$, or a highly diffuse reflecting ceramics. As can be appreciated, such a structure exhibits advantageous manufacture/assembly characteristics and is an ideal candidate as a pumping source of high power. It should also be understood that the diffusing pump chamber 320 shown in FIG. 3 is only an exemplary embodiment of the present invention. A variety of alternatives such as CPC with a single parabolic portion or multiple parabolic portions may be taken without departure from our inventive principles.

By positioning the gain medium 310 at the focus point of the diffusing pump chamber 320, the pump light emitted from the VCSEL array 350 is diffusely reflected into the gain medium. With this coupling mechanism, the gain medium is efficiently and uniformly excited.

One of the hurdles for high-power solid-state lasers is the lack of appropriate pumping source. Currently available commercial systems with average powers in excess of 10 W are still, for the most part, flash-lamp or CW-arc lamp pumped. Flash-lamp pumping is inherently of low coupling efficiency, short operating lifetime, and limited repetition rate, resulting in high power consumption and requiring complicated cooling systems. In diode-pumped high-power solid-state lasers, the diode arrays are the major cost driver, making them uncompetitive with lamp-pumped systems. This hurdle can be overcome by the use of the present invention. For further understanding of our inventive principles, numerical analysis is conducted for the following exemplary lasers.

Rare-earth tunable lasers such as Tm, Ho, or Yb doped YAG, YLF or YAP lasers are primarily employed as laser sources in the IR region and are of particular interest for medical applications, remote sensing and coherent radar systems. Flash-lamp pumping is not particularly efficient in these 3-level lasers. Fortunately, the present invention makes VCSEL arrays an efficient and inexpensive pump source for these materials.

Figure 4:
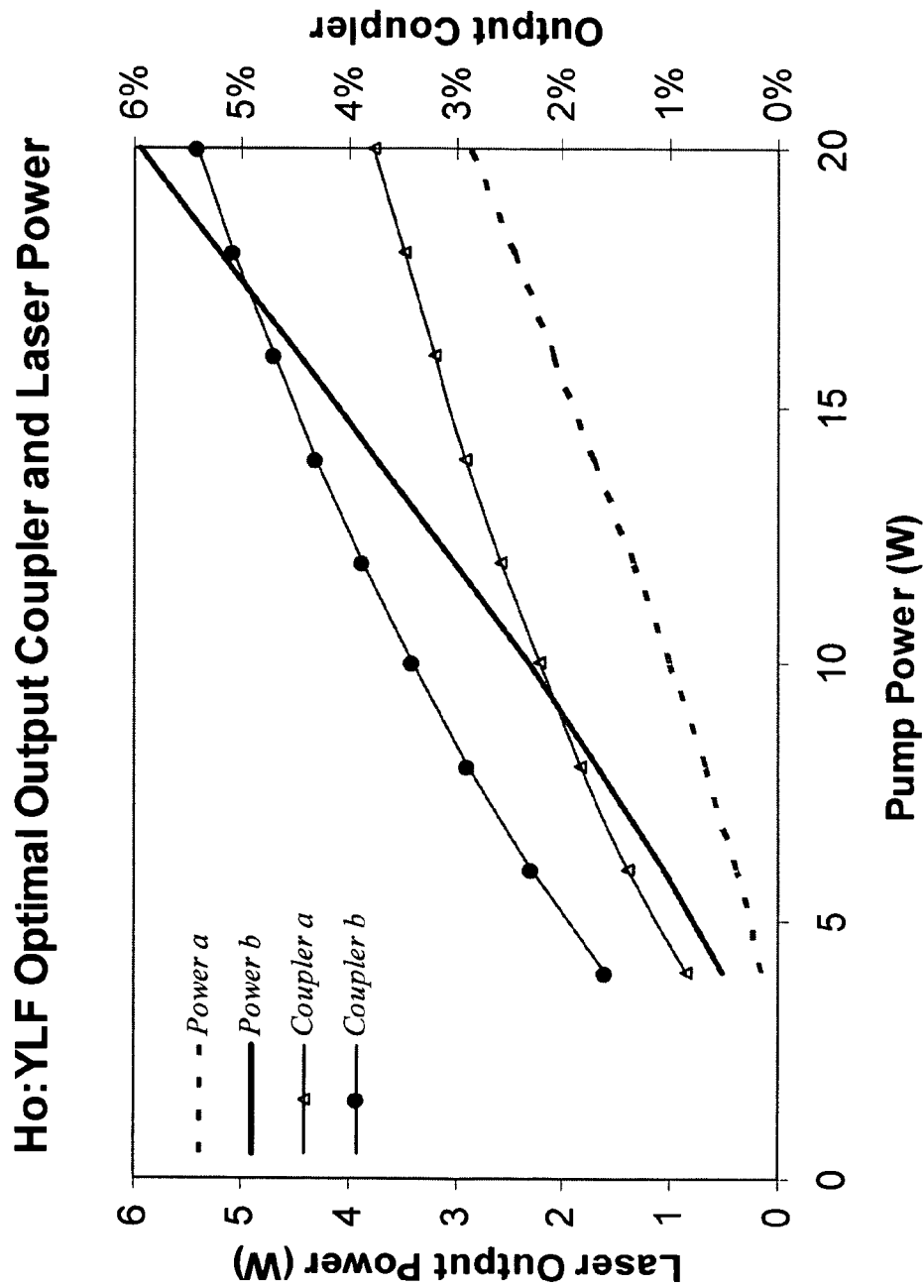
FIG. 4 compares Ho:YLF laser performances with or without a diffusing pump chamber in terms of optimal transmittance of the output coupler and laser output power of the optimized resonator.

With reference to FIG. 4, where a comparison of Ho:YLF laser performance with or without a diffusing pump chamber constructed according to our inventive teachings is shown. Optimal transmittance of the output coupler and laser output power of the optimized resonator are calculated and displayed. In this figure, label a represents a configuration without integration of a diffusing pump chamber, while label b represents a configuration with a diffusing pump chamber as preferably shown in FIG. 1A or FIG. 3. Evidently, the present invention makes significant improvement.

As an example of tunable lasers in the 2 μm region, Tm:YAG produces laser emission peaked at 2.02 μm with a tunability typically from 1.87 μm to 2.16 μm. The absorption spectrum of Tm:YAG is centered at 785 nm and has a bandwidth of 4 nm. There are commercially available VCSEL arrays such as Aluminum Gallium Arsenide (AlGaAs) VCSEL arrays well match this range. Since the lower laser level is in the ground state manifold, the laser threshold is relatively high. This limits the application of Tm:YAG lasers. Fortunately, our invention successfully overcomes this drawback. As can be appreciated by referring to FIG. 5, 10 W CW laser output around 2.02 μm can be achieved with 100 W of pump power. This can be realized by a VCSEL array with size of 1 cm² or smaller, in association with a diffusing pump chamber as preferably displayed in FIG. 1A or FIG. 3. Moreover, by the use of VCSEL arrays emitting light around 805 nm, the Tm:YAG crystal can be wing-pumped, which benefits heat removal and reduction of thermal loading in high power laser operation. As an additional advantage of our inventive teachings, the efficiency and uniformity of such wing pumping can be very high.

Figure 5:
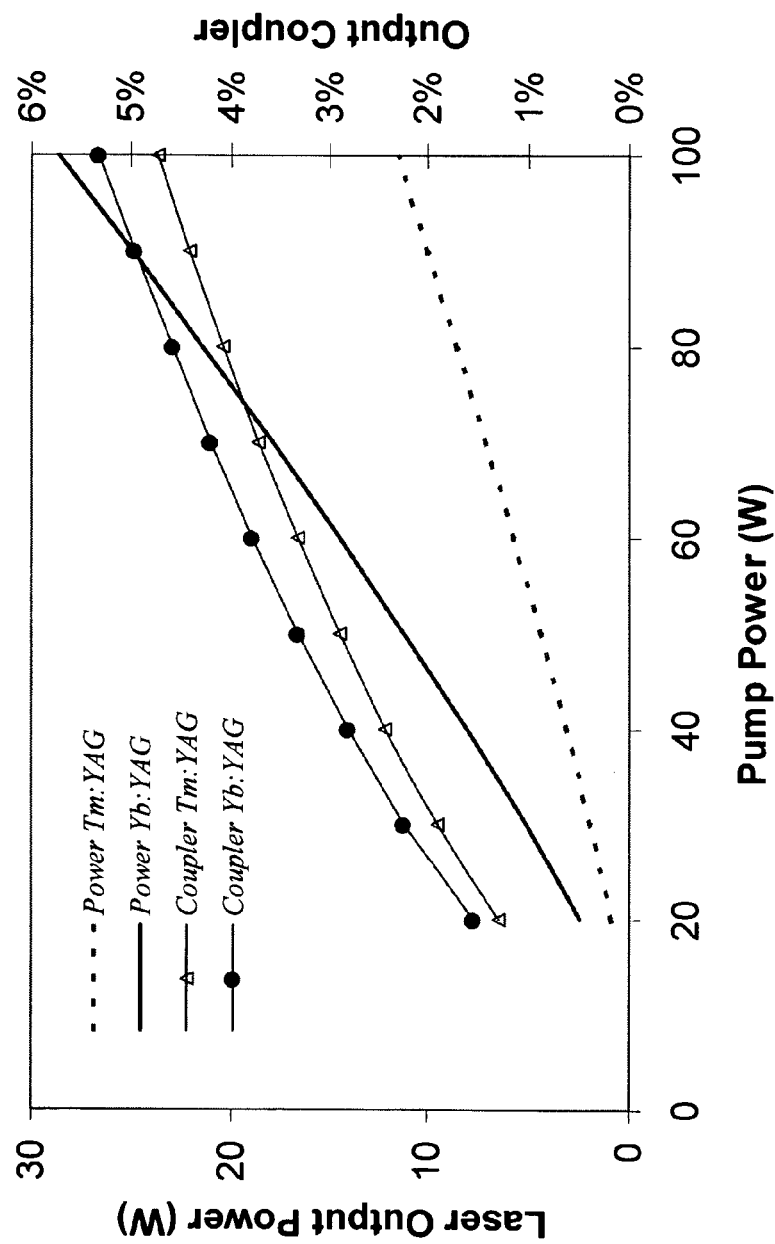
FIG. 5 demonstrates performances of Tm:YAG and Yb:YAG lasers in terms of optimal transmittance of the output coupler and laser output power of the optimized resonator.

On the other hand, Yb:YAG, which emits laser at 1.03 μm, has only a single absorption feature around 942 nm. This eliminates the possibility of using flash lamps as pump sources. In addition, the performance of Yb:YAG strongly depends on temperature. Efficient and uniform injection of pump light into the gain medium thus is critical. Fortunately, the present invention provides an ideal solution for this type of lasers. Compared to edge-emitting laser diodes, VCSEL arrays have lower temperature sensitivity, typically shift their emission wavelength around 0.02 nm/C.°, which is well suitable to the absorption spectrum of Yb:YAG having a bandwidth of 18 nm. As shown in FIG. 5, CW laser output of 30 W or higher at 1.03 μm is achievable from an Yb:YAG laser according to our inventive teachings. In addition, pumping of Yb:YAG with VCSEL arrays emitting 942 nm light produces relatively small amount of crystal heating compared to other major laser gain media due to the very small quantum defect or Stokes shift. For example, the fractional thermal loading is around 11% for Yb:YAG pumped at 942 nm, while for Nd:YAG pumped at 808 nm it is 32%. This benefits the laser for high power applications.

Erbium has attracted attention because of two particular wavelengths of interest, i.e., 2.94 μm from transition between $^4I_{11/2}$ and $^4I_{13/2}$ in a crystal such as YAG highly doped with erbium and 1.54 μm from transition between $^4I_{13/2}$ and $^4I_{15/2}$ in an Er-doped phosphate or silicate glass. Both of these wavelengths can be absorbed by water, which leads to interesting medical applications. However, the efficiency and output energy of erbium lasers pumped by flash lamps are very low.

With the present invention, Er:YAG crystal can be pumped with VCSEL arrays of suitable semiconductor materials such as Indum Gallium Arsenide (InGaAs) that emits light around 963 nm. Other erbium lasers such as Er:YLF, Er:YAlO₃, and Er:Cr:YSGG can also be operated in both pulsed and CW modes according to our inventive teachings.

Figure 6:
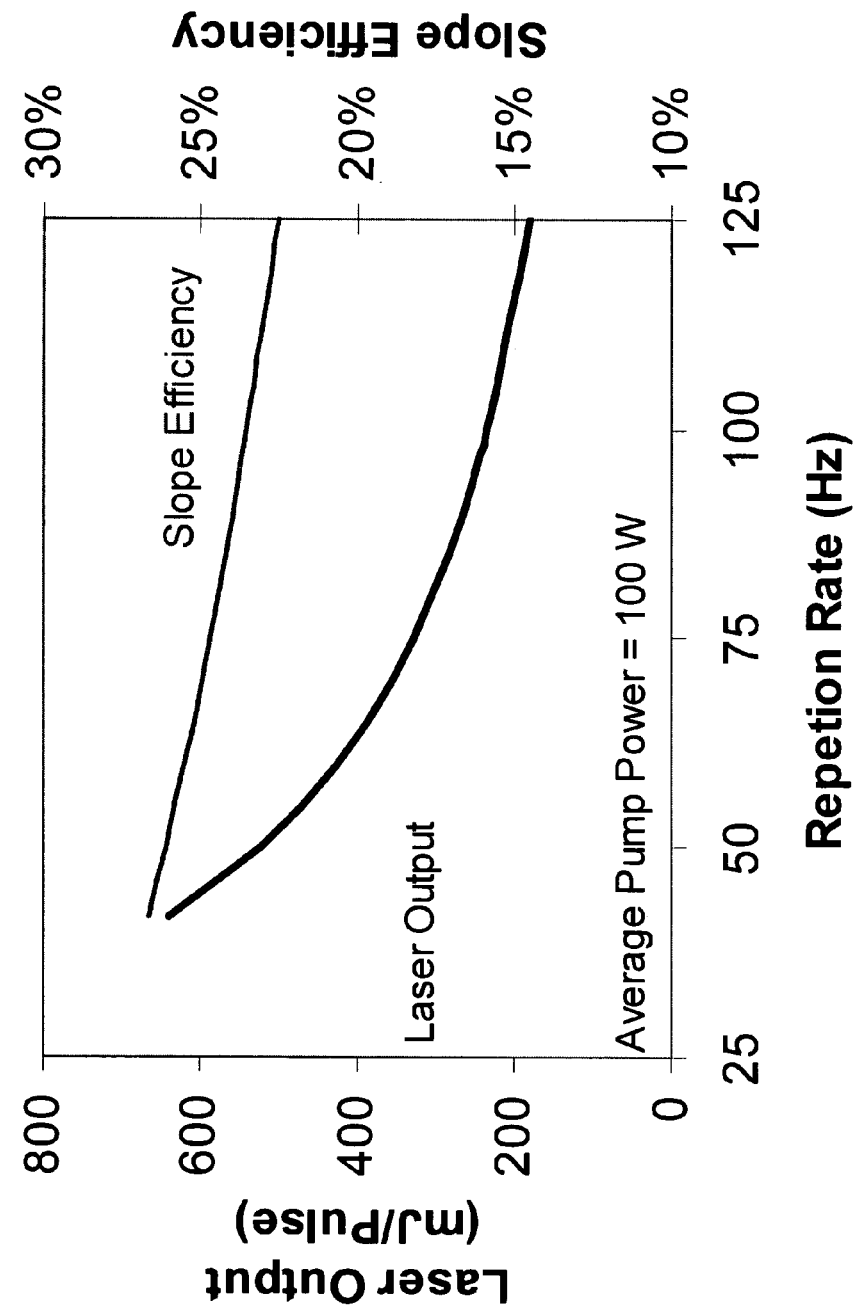
FIG. 6 demonstrates output energy and slope efficiency of Er:Yb:glass laser operated at pulsed modes.

Due to the three-level behavior and the weak absorption of pump radiation, erbium glass laser is often sensitized with ytterbium, which has a relatively strong absorption band around 1 μm. Here again our inventive teachings find important applications. For example, VCSEL arrays emitting light at 980 nm can be used as a light source for pumping Er:Yb: glass laser. As can be derived from FIG. 6, 400 mJ/pulse output can be obtained from an Er:Yb:glass laser having a gain medium diameter of 2 mm and length of 20 mm in an optimized resonator with output coupler transmission of 22%, and pumped by VCSEL arrays operating at pulsed mode with 1600 mJ energy per pulse, 8 ms pulse width, and 60 Hz repetition rate. At CW mode, the achievable laser output power is 22.5 W, corresponding to a slope efficiency of 22.5%.

Figure 7:
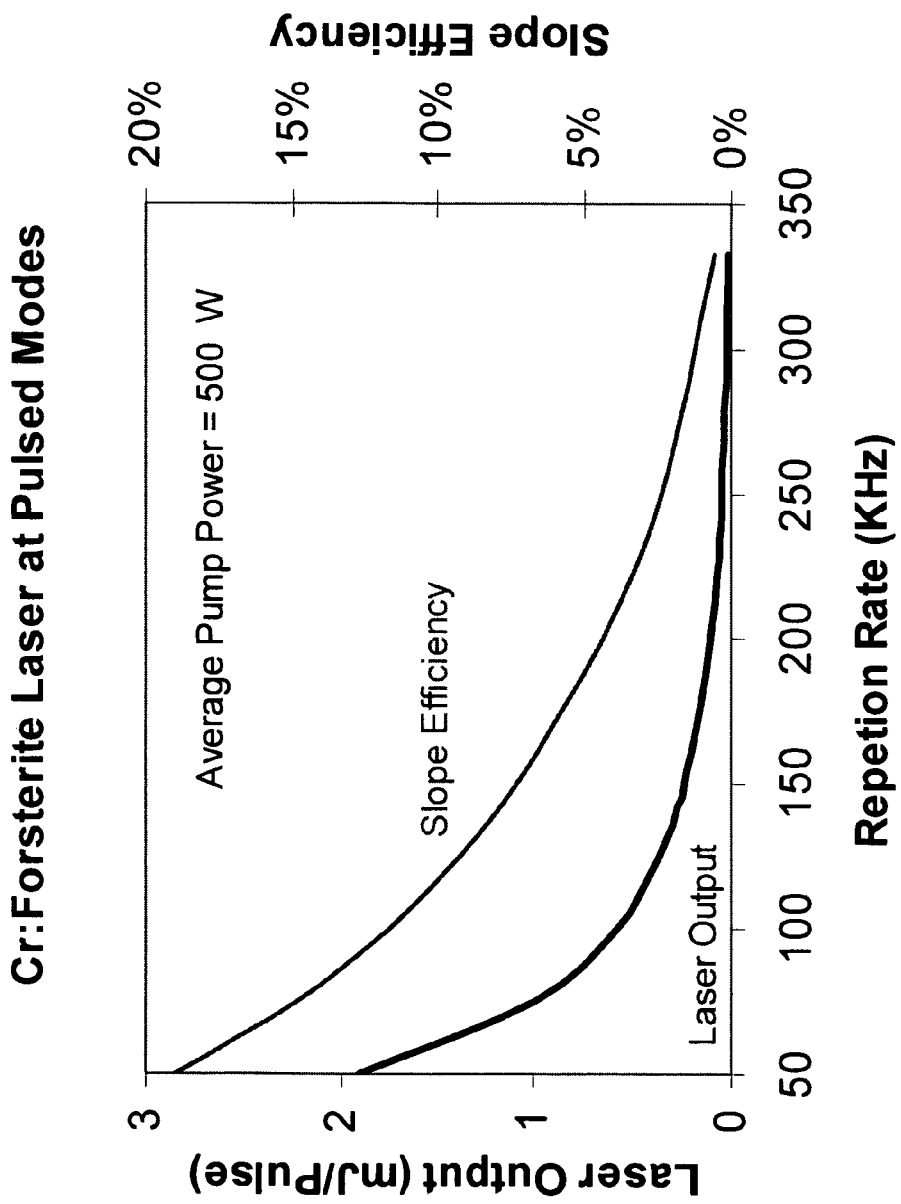
FIG. 7 demonstrates output energy and slope efficiency of Cr:Forsterite laser operated at pulsed modes.

A further advantage of the present invention is its applicability to pulsed laser operation at high repetition rates, which is particularly important for gain media with short lifetime of upper state. One exemplary system is Cr:Forsterite (Cr⁴⁺: Mg₂SiO₄). This vibronic active material attracts interest because its laser emission fills the void in the near IR region from 1167 nm to 1345 nm, which has important applications in imaging, optical coherence tomography, spectroscopy, and ranging, but is not covered by any other solid-state laser. At the room temperature, Cr:Forsterite has a fluorescence lifetime of approximately 3 μs. It has broad absorption bands near 740 nm and 1075 nm, making VCSEL arrays a promising pump source. Although the absorption coefficient at 740 nm is about six times that at 1075 nm, our inventive structure enables efficient and uniform pumping at the longer wavelength to achieve higher quantum efficiency. As shown in FIG. 7, 1.9 mJ/pulse output can be obtained from a Cr:Forsterite laser having a gain medium diameter of 2 mm and length of 20 mm in an optimized resonator with an output coupler transmission of 6%, and pumped by VCSEL arrays operating at pulsed mode with 10 mJ energy per pulse, 3 μs pulse width, and 50 KHz repetition rate. When operated at CW mode, 2.9 W of laser output power is achieved, corresponding to a slope efficiency of 0.6%.

It should be mentioned that the forgoing numerical analysis is for illustration of our inventive principles only. As can be appreciated by those skilled in the art, a variety of laser systems can be constructed according to our inventive teachings. A particularly important application of the present invention is high-power solid-state lasers featuring wavelength conversion.

High demands in eye-safe laser transmitters and LIDAR, mid-IR remote sensing and medical applications have stimulated much interest in development of high-power Optical Parametric Oscillator (OPO). Laser projection display systems, material processing, and many biomedical applications such as diagnostics and therapy demand laser wavelengths in the visible and UV ranges, which often requires wavelength conversion. Harmonic generation and sum frequency mixing are common processes to achieve this goal.

Figure 8A:
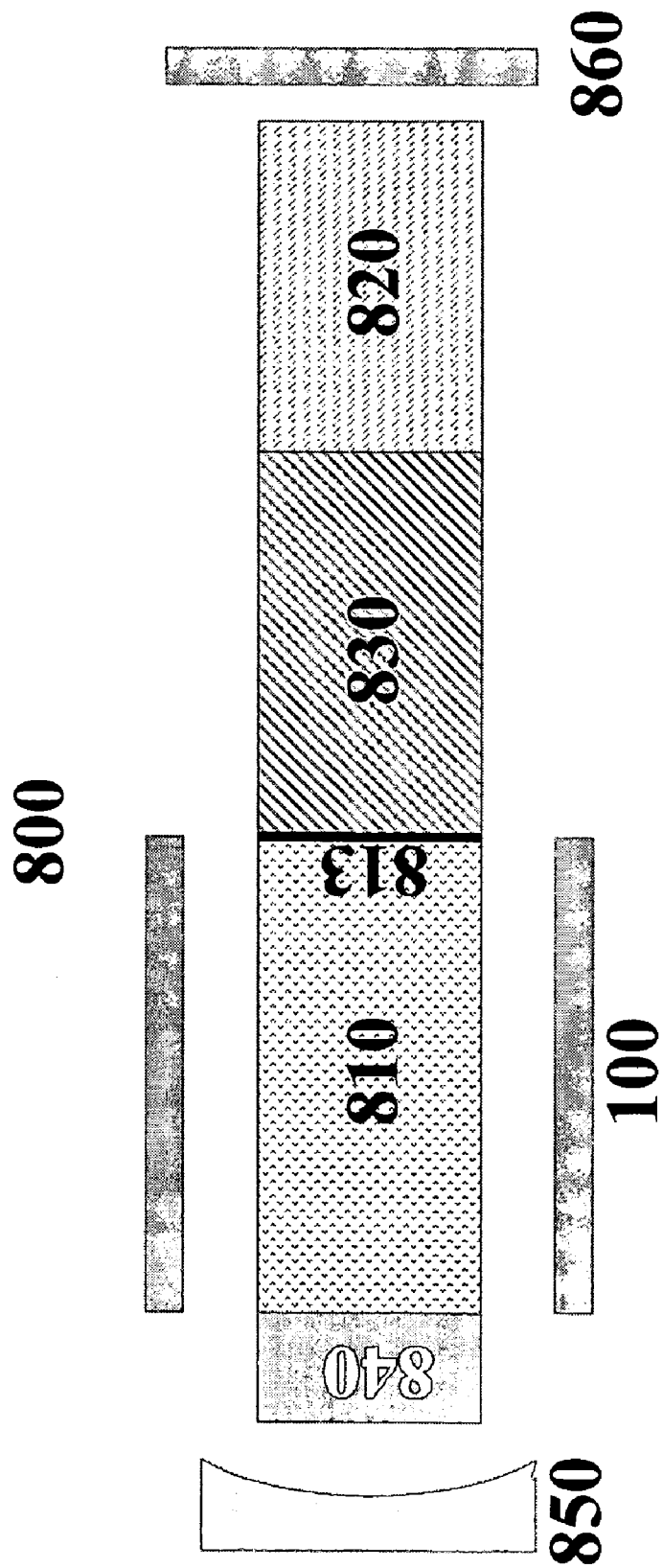
FIG. 8A illustrates an embodiment of the high-power solid-state laser with wavelength conversion according to the present invention.

Referring now to FIG. 8A, where an embodiment of the inventive high-power solid-state laser featuring wavelength conversion is shown. The laser system 800 comprises a gain medium 810 surrounded by a pump assembly 100, a birefringent crystal 830, a nonlinear optical crystal 820 for wavelength conversion, an optional Q-switch element 840, and cavity mirrors 850 and 860. These crystals are preferably optically bonded each other to form a monolithic structure.

In operation, the gain medium 810 is optically excited by the pump assembly 100 and the population is inversed, resulting in stimulated emission at wavelength $\lambda_1$. Through a nonlinear optical process in 820, the wavelength $\lambda_1$ is converted to $\lambda_2$. In order to support resonant oscillation, the interfacial surface 813 between the gain medium 810 and the birefringent crystal 830 is coated anti-reflective (AR) to $\lambda_1$ and highly-reflective (HR) to $\lambda_2$ for resonant nonlinear optical process. The cavity mirrors 850 and 860 can be concave or flat or directly coated onto the external surfaces of the monolithic structure. The mirror 850 is HR to $\lambda_1$, while the mirror 860 is HR to $\lambda_1$ and highly transmissive (HT) to $\lambda_2$. These two mirrors form a resonant cavity.

The gain medium 810 can be naturally birefringent or isotropic, doped with active ions or co-doped with active ions and sensitizer. For isotropic gain medium such as Nd:YAG, the emission has no polarization preference. In order to obtain linearly polarized laser output, Brewster angle cut or intracavity polarizer is conventionally used. In some other gain media, two radiative transitions of different polarization states may be induced from the same upper and lower energy levels. For example, upon excitation by a pump light to energy level $^4F_{3/2}$, the extraordinary transition between $^4F_{3/2}$ and $^4I_{11/2}$ corresponding to wavelength of 1.047 μm (π) and the ordinary transition between the same energy levels corresponding to wavelength of 1.053 μm (σ) may occur simultaneously in Nd:YLF, with nearly equivalent stimulated emission cross-sections. Undesired stimulated emission may deplete the population of the upper state, which reduces the laser efficiency. An intracavity polarizer is conventionally used for selecting lasing at the desired line. Unfortunately, insertion of polarizers often introduces additional cavity loss and increases laser threshold.

Figure 8B:
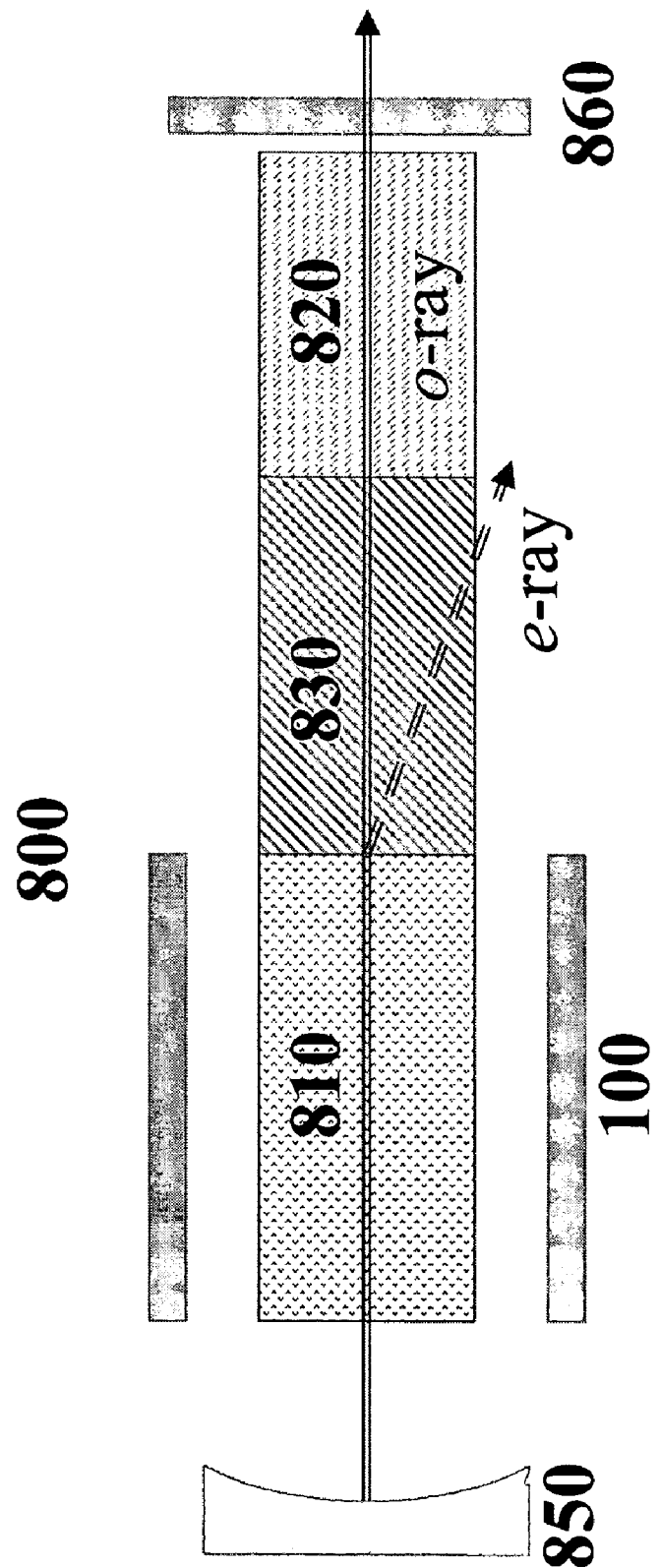
FIG. 8B graphically illustrates the scheme for selecting a desired lasing.

These problems can be solved by insertion of the birefringent crystal 830 between the gain medium 810 and the nonlinear crystal 820. According to our inventive teachings and as conceptually shown in FIG. 8B, the extraordinary component (e-ray) of the laser beam emitted from the solid-state laser, if any, deviates away from the resonant cavity due to the walk-off effect. Lasing oscillation can only occur for the ordinary component (o-ray). This configuration enables monolithic structure and intracavity loss reduction.

Figure 8C:
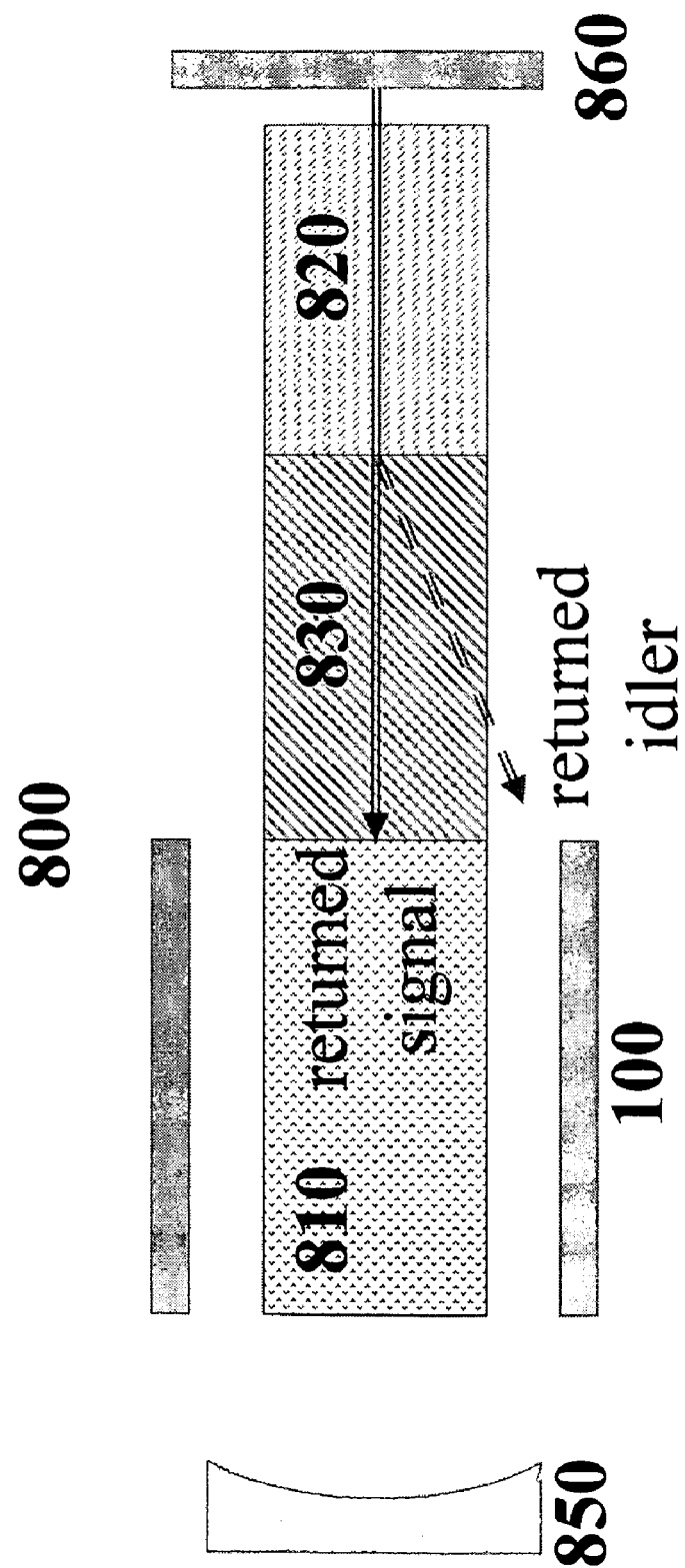
FIG. 8C graphically illustrates the scheme for eliminating possible interference between the signal and the idler and for realizing highly efficient singly-resonant OPO.

Another role of the birefringent crystal 830 is graphically illustrated in FIG. 8C. The propagation direction of the idler wave reflected from the mirror 860, which is extraordinary in the birefringent crystal 830, is tilted due to the walk-off effect. Resonant oscillation of the idler, which often occurs in high-gain operations even with very low reflection, thus cannot be established. This configuration creates a singly-resonant parametric oscillation with return pump beam, which reduces the threshold and improves the efficiency for pump-to-signal energy conversion. With this configuration, highly efficient singly-resonant OPO is achievable in a compact and cost-effective manner. Interference of the idler to the signal can be eliminated, making improvement on the optical quality. In addition, thermal problems related to propagation and absorption of the idler wave in high-average-power OPO can be mitigated, which reduces the cooling requirement. By changing the phase matching conditions or rotating the birefringent crystal 830 by 90°, our inventive structure can be alternatively used for suppressing resonant oscillation of the signal and realizing singly-resonant OPO for the idler.

Our inventive teachings and the merits thereof can be better understood through examples.

EXAMPLE ONE

The gain medium 810 is Nd:YAG, which is pumped by an odd number of VCSEL arrays at 808 nm to produce laser emission at 1064 nm. High-power green light at 532 nm is produced after SHG in the nonlinear optical crystal 820.

EXAMPLE TWO

The gain medium 810 is Nd:YVO$_4$, which is pumped by an odd number of VCSEL arrays at 808 nm to produce laser emission at 1064 nm. High-power green light at 532 nm is produced after SHG in the nonlinear optical crystal 820. The birefringent crystal 830 is removed in this configuration.

EXAMPLE THREE

The gain medium 810 is Nd:YAG, which is pumped by an odd number of VCSEL arrays at 808 nm to produce laser emission at 1064 nm. The birefringent crystal 830 supports the laser oscillation polarized normal to its principal plane and suppresses another component. Intracavity OPO is singly resonated at the signal wavelength. Resonant oscillation at the idler wavelength is suppressed by the walk-off effect in 830. Cr:YAG is utilized as passive Q-switch element 840. Q-switched eye-safe laser output at 1.54 μm is produced after OPO in KTP crystal 820.

EXAMPLE FOUR

The gain medium 810 is Nd:YLF, which is pumped by an odd number of VCSEL arrays at 808 nm to produce laser emission. The birefringent crystal 830 supports the laser oscillation at 1047 nm (π component). Green light at 524 nm is produced after SHG in the nonlinear optical crystal 820.

EXAMPLE FIVE

The gain medium 810 is Nd:YLF, which is pumped by an odd number of VCSEL arrays at 808 nm to produce laser emission. The birefringent crystal 830 supports the laser oscillation at 1053 nm (σ component). Intracavity OPO is singly resonated at the idler wavelength. Resonant oscillation at the signal wavelength is suppressed by the walk-off effect in 830. Mid-IR laser output at around 3.5 μm is produced after OPO in KTP crystal 820.

EXAMPLE SIX

The gain medium 810 is Nd:YVO$_4$, which is pumped by an odd number of VCSEL arrays at 808 nm to produce laser emission at 914 nm. Cr:YAG is utilized as passive Q-switch element 840. Q-switched blue laser output at 457 nm is produced after SHG in BBO crystal 820. The birefringent crystal 830 is removed in this configuration.

EXAMPLE SEVEN

The gain medium 810 is Nd:YVO$_4$, which is pumped by an odd number of VCSEL arrays at 808 nm to produce laser emission at 1064 nm. Intracavity OPO is singly resonated at the signal wavelength. Resonant oscillation at the idler wavelength is suppressed by the walk-off effect in 830. Transparent electro-optic ceramics such as PLZT or PMN-PT is utilized as active Q-switch element 840 for high repetition rates. Q-switched eye-safe laser output at 1.54 μm is produced after OPO in KTP crystal 820.

EXAMPLE EIGHT

The gain medium 810 is Cr:Nd:GSGG, which is pumped by an odd number of VCSEL arrays centered around 640 nm to produce laser emission at 1061 nm. The birefringent crystal 830 supports the laser oscillation polarized normal to its principal plane and suppresses another component. Polarized green light at 530 nm is produced after SHG in the nonlinear optical crystal 820.

EXAMPLE NINE

The gain medium 810 is Cr:Nd:GSGG, which is pumped by an odd number of VCSEL arrays centered around 640 nm to produce laser emission at 1061 nm. The birefringent crystal 830 supports the laser oscillation polarized normal to its principal plane and suppresses another component. Intracavity OPO is singly resonated at the signal wavelength. Resonant oscillation at the idler wavelength is suppressed by the walk-off effect in 830. High-power eye-safe laser output between 1.5-1.6 μm is produced after OPO in KTP crystal 820.

Figure 9:
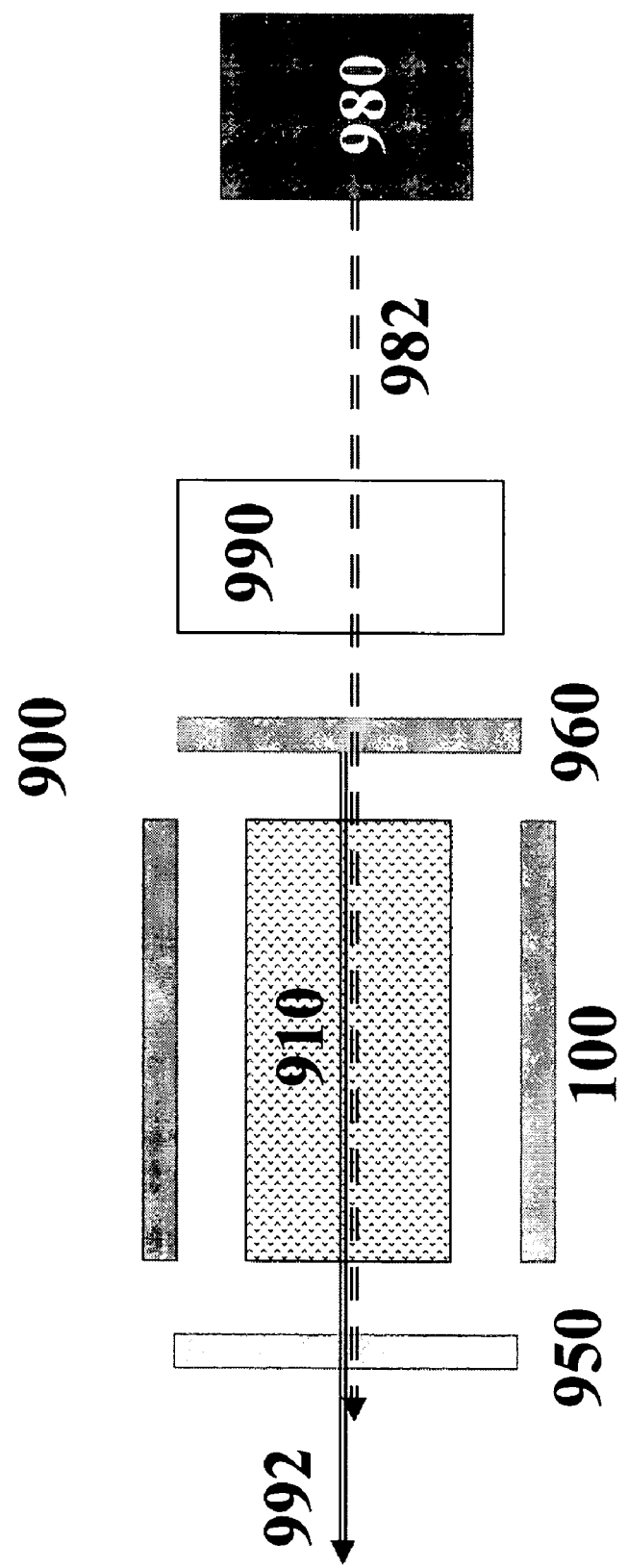
FIG. 9 illustrates an embodiment of injection-seeded solid-state laser activated by the pump assembly constructed according to the present invention.

Another particularly important application of the present invention is injection seeding. An example of such systems is schematically shown in FIG. 9. A seed laser 980 emits light 982, which is injected into the gain medium 910 for spectral and temporal mode control. In accordance with our inventive teachings, the gain medium 910 is a rod and is placed at the center of the pump assembly 100. An odd number of VCSEL arrays are evenly distributed along the perimeter of the diffusion chamber. An optical isolator 990 is employed to prevent interference or damage to the seed laser 980 due to fed-back light. This configuration enables injection seeding at high repetition rates. Depending on specific applications, the laser output 992 can be extracted through different optical surfaces in various directions.

As can be understood by those skilled in the art, our inventive laser system can be incorporated with many other technologies to satisfy specific needs of various applications.

What is claimed is:

1. A laser device comprising:
   an active laser gain medium;
   an optical cavity having a set of passive optical elements;
   a pump assembly for generation of incoherent or partially coherent, monochromatic excitation light and for efficient and uniform injection of the excitation light into said active laser gain medium; and
   a housing assembly, containing the optical cavity, the active laser gain medium, and the pump assembly;
   wherein:
   said housing assembly physically protects the laser system and effectively dissipates the heat generated during laser operation;
   said pump assembly further comprising:
   an excitation element having a two-dimensional VCSEL array to produce incoherent or partially coherent, monochromatic excitation light and
   a power supply, electrically connected to the excitation element at the array level, for energizing the excitation element to produce the excitation light; and
   a tubular diffusing pump chamber, its cross-section is shaped with two or more overlapping parabolic section(s), wherein
   the two-dimensional VCSEL array forms one side of the chamber,
   the rest part of the pump chamber surface is a reflector to the excitation wavelength,
   the pump chamber effectively surrounds the active laser gain medium and in axial alignment with the gain medium,
   the central axis of the active laser gain medium is located at or near the focus of the chamber, whereby a population of the active species becomes substantially inverted in response to excitation by incoherent or partially coherent monochromatic pump light, and
   the effects of the excitation light on the gain medium is enhanced through multiple bounces from the inner surface of the pump chamber.

2. The laser device according to claim 1 further comprising:
   a pulse controller for producing pulses of excitation light from the excitation element such that pulses of laser light are produced from the lasing element.

3. The laser device according to claim 1 further comprising:
   a seed laser, which injects signal into the active gain medium for spectral and temporal mode control, and a mechanism for optical coupling, which extracts laser output generated from the active gain medium and isolates the seed laser from fed-back light.

4. The laser device according to claim 1 further comprising:
   at least one nonlinear optical crystal, which is situated in the laser path for intracavity wavelength conversion.

5. The laser device according to claim 1 further comprising a Q-switch element for producing high-power laser pulses.

* * * * *